US012541890B2

(12) United States Patent
Li et al.

(10) Patent No.: US 12,541,890 B2
(45) Date of Patent: Feb. 3, 2026

(54) IMAGE PROCESSING METHOD AND APPARATUS

(71) Applicants: Beijing BOE Display Technology Co., Ltd., Beijing (CN); BOE Technology Group Co., Ltd., Beijing (CN)

(72) Inventors: Zhifu Li, Beijing (CN); Zhiqiang Wang, Beijing (CN); Jinghua Miao, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 168 days.

(21) Appl. No.: 18/554,926

(22) PCT Filed: Oct. 31, 2022

(86) PCT No.: PCT/CN2022/128775
§ 371 (c)(1),
(2) Date: Oct. 11, 2023

(87) PCT Pub. No.: WO2024/092461
PCT Pub. Date: May 10, 2024

(65) Prior Publication Data
US 2025/0095231 A1    Mar. 20, 2025

(51) Int. Cl.
*G06T 11/00* (2006.01)
*G06F 3/14* (2006.01)
*G06T 7/90* (2017.01)

(52) U.S. Cl.
CPC ............. *G06T 11/001* (2013.01); *G06F 3/14* (2013.01); *G06T 7/90* (2017.01)

(58) Field of Classification Search
CPC ............ G06T 11/001; G06T 7/90; G06F 3/14
See application file for complete search history.

(56) References Cited

U.S. PATENT DOCUMENTS

2007/0025613 A1    2/2007  Lee et al.
2007/0146242 A1*   6/2007  Miller ................. G09G 3/2074
                                                  345/76
(Continued)

FOREIGN PATENT DOCUMENTS

CN    1905685 A      1/2007
CN    101430871 A    5/2009
(Continued)

OTHER PUBLICATIONS

Klompenhouwer, Michiel A., Gerard De Haan, and Rob A. Beuker. "13.4: Subpixel image scaling for color matrix displays." SID Symposium Digest of Technical Papers. vol. 33. No. 1. Oxford, UK: Blackwell Publishing Ltd, 2002. (Year: 2002).*

(Continued)

*Primary Examiner* — Yu Chen
(74) *Attorney, Agent, or Firm* — IPro, PLLC

(57) ABSTRACT

An image processing method and apparatus. The method includes: determining color values of original pixels in an original color image, where for each of the original pixels, the original pixel includes N original sub-pixels corresponding to different basic colors of a color model respectively, a color value of the original pixel includes color components of the basic colors corresponding to the N original sub-pixels, and N is a positive integer greater than 1; generating mixed images corresponding to the N basic colors respectively according to the color values of the original pixels, where N original pixels in the original color image corresponding one-by-one to N mixed sub-pixels in the mixed pixel are determined, and color components of the basic color in the color values of the N original pixels are determined as color components corresponding to the N mixed sub-pixels respectively.

14 Claims, 4 Drawing Sheets

(56) References Cited

U.S. PATENT DOCUMENTS

| | | | |
|---|---|---|---|
| 2008/0030447 A1* | 2/2008 | Ben-David | G02F 1/134309 |
| | | | 345/88 |
| 2009/0295839 A1* | 12/2009 | Furukawa | G09G 3/3413 |
| | | | 345/88 |
| 2010/0259552 A1* | 10/2010 | Hsu | G09G 3/3413 |
| | | | 345/592 |
| 2016/0307482 A1 | 10/2016 | Huang et al. | |
| 2018/0114495 A1 | 4/2018 | Jung | |
| 2020/0286445 A1* | 9/2020 | Wang | G09G 5/026 |
| 2021/0012724 A1* | 1/2021 | Wang | G09G 3/3413 |

FOREIGN PATENT DOCUMENTS

| | | |
|---|---|---|
| CN | 104112436 A | 10/2014 |
| CN | 104155804 A | 11/2014 |
| CN | 106444137 A | 2/2017 |
| CN | 109934795 A | 6/2019 |
| CN | 109960082 A | 7/2019 |
| TW | 200847095 A | 12/2008 |
| WO | 0154397 A2 | 7/2001 |

OTHER PUBLICATIONS

PCT/CN2022/128775 international search report, Jul. 6, 2023.
PCT/CN2022/128775 Written Opinion, Jul. 6, 2023.

\* cited by examiner

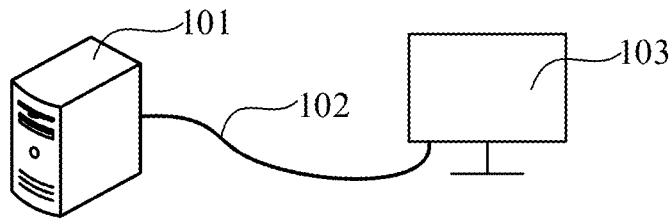

FIG. 1

```
┌─────────────────────────────────────────────────────┐
│ Determine color values of original pixels in an original color │
│    image, where for each of the original pixels, the original  │
│         pixel includes N original sub-pixels corresponding to  │
│   different basic colors of a color model respectively, a color│ ~202
│  value of the original pixel includes color components of the  │
│    basic colors corresponding to the N original sub-pixels, and│
│              N is a positive integer greater than 1.           │
└─────────────────────────────────────────────────────┘
                              ↓
┌─────────────────────────────────────────────────────┐
│    Generate mixed images corresponding to the N basic colors   │
│        respectively according to the color values of the original│
│   pixels, for each mixed pixel in a mixed image corresponding  │
│   to a basic color, N original pixels in the original color image│
│             corresponding one-by-one to N mixed sub-pixels in the│ ~204
│          mixed pixel are determined according to a pixel-position│
│    mapping relation, and color components of the basic color in│
│      the color values of the N original pixels are determined as│
│     color components corresponding to the N mixed sub-pixels   │
│                           respectively.                         │
└─────────────────────────────────────────────────────┘
                              ↓
┌─────────────────────────────────────────────────────┐
│ Upon generating the mixed image corresponding to the basic     │
│     color, send the mixed image to a field sequential display  │
│      device according to an image transmission rule consistent │
│     with the color model, so that the field sequential display │ ~206
│         device generates and displays a monochrome image       │
│       corresponding to the basic color according to the mixed  │
│                              image                              │
└─────────────────────────────────────────────────────┘
```

FIG. 2

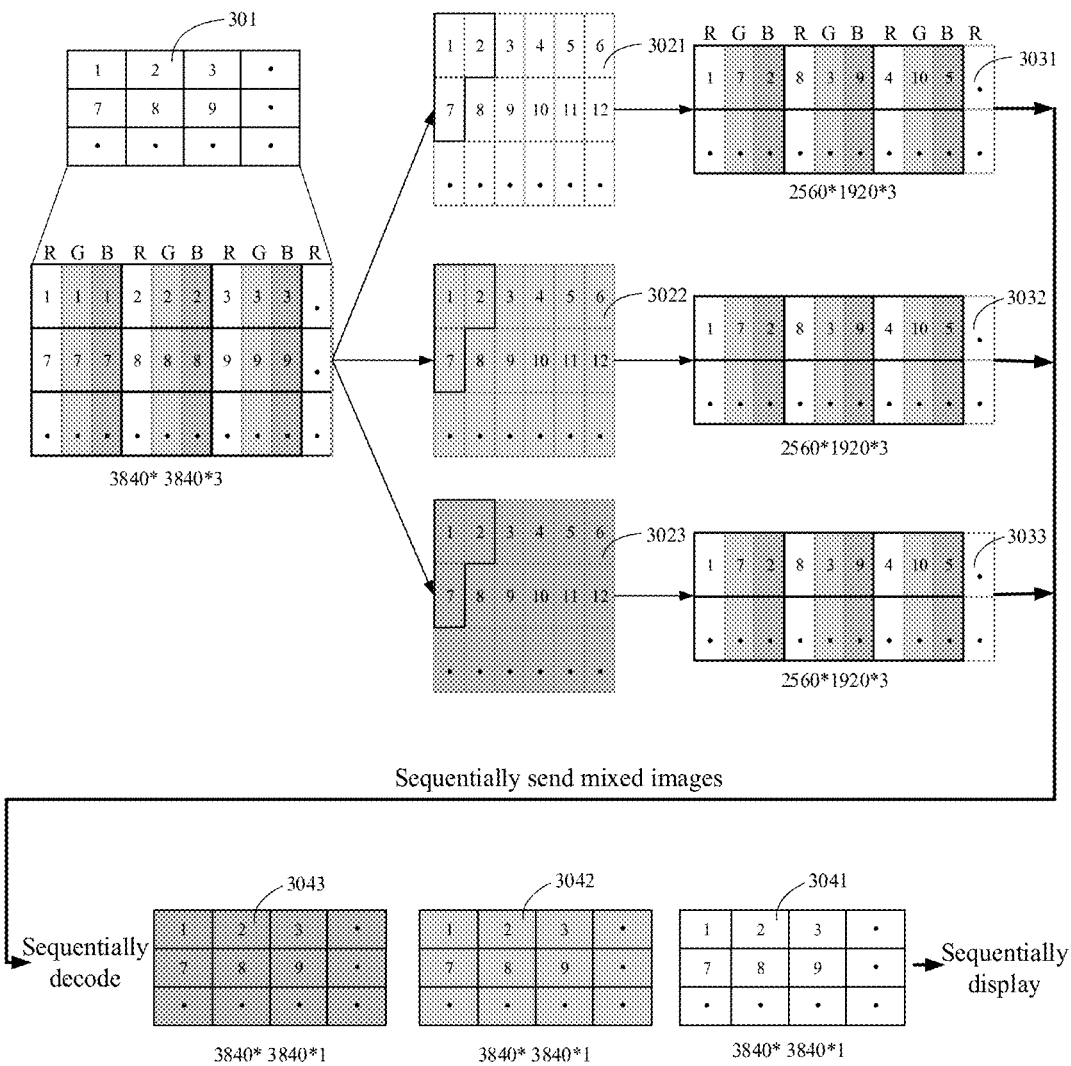
FIG. 3
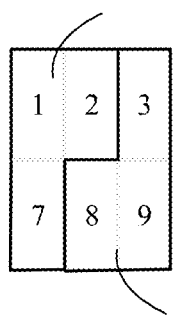
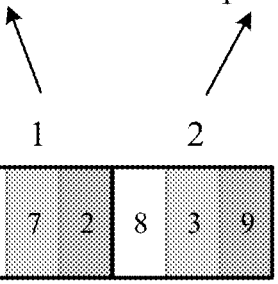
FIG. 4

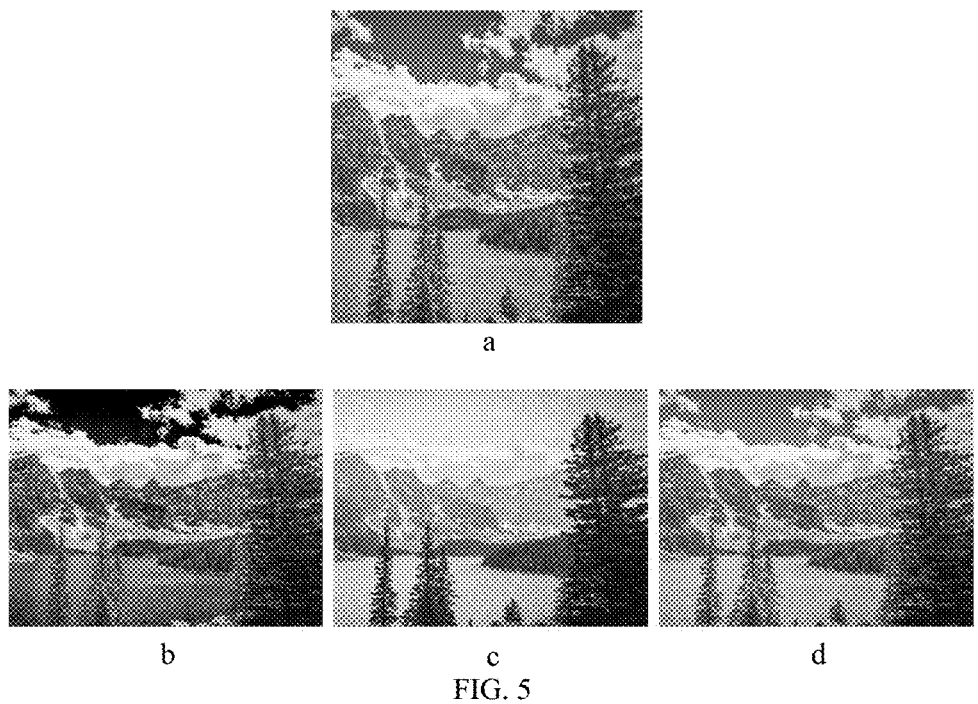

FIG. 5

```
Upon receiving a mixed image sent according to an image
transmission rule consistent with a color model, determine color
values of mixed pixels in the mixed image, where the mixed
image corresponds to a basic color of the color model, and a       ~ 602
color value of each mixed pixel includes color components
corresponding to the basic color of N mixed sub-pixels in the
mixed pixel, and N is a positive integer greater than 1
```

```
Generate a monochrome image corresponding to the basic color
according to the color values of the mixed pixels, where for the
N mixed sub-pixels in the mixed pixel, N monochrome pixels in
the monochrome image corresponding one-by-one to the N
mixed sub-pixels are determined according to a pixel-position     ~ 604
mapping relation, and determine color components of the basic
color of the N mixed sub-pixels are respectively determined as a
color value of a corresponding monochrome pixel
```

```
Display the monochrome image by controlling a display
component of the field sequential display device                  ~ 606
```

FIG. 6

IMAGE PROCESSING METHOD AND APPARATUS

CROSS-REFERENCE TO RELATED APPLICATIONS

This application is a national stage of international PCT Application No. PCT/CN2022/128775 filed on Oct. 31, 2022, the entire contents of which are incorporated herein by reference.

TECHNICAL FIELD

The present disclosure relates to the technical field of image processing, and in particular, to an image processing method and apparatus.

BACKGROUND

A field sequential display device (also referred to as a field sequential liquid crystal screen) is a new type of liquid crystal display device. For a conventional LCD (Liquid Crystal Display), a pixel is consisted of a plurality of partitions, while a pixel in the field sequential display device is consisted of one partition. To display a color image, another device can process the color image into monochrome images and send the monochrome images to a field sequential display device, and the field sequential display device can control liquid crystals and color films of pixels to control the pixels to sequentially display monochrome images with different colors, and with help of "visual persistence effect", display effect of a color image is presented.

However, based on the above display principle, the field sequential display device needs to adopt a higher refresh rate than that of the conventional LCD to display the monochrome images. For example, for an RGB image, to achieve a display effect realized by a conventional LCD adopting a refresh rate of 90 Hz, the field sequential display device needs to display the monochrome images with a refresh rate of 270 Hz. Correspondingly, the other device needs to render 270 frames of images and transmit data of the 270 frames of images to the field sequential display device per second. Therefore, in a case of displaying high-resolution images (e.g., displaying 4K video images), a data transmission channel between the other device and the field sequential display device will face great bandwidth pressure. Since a monochrome image usually follows a corresponding multi-channel rule, for example, three channels of RGB transmit red, green and blue images respectively, and at this time, only one channel is transmitting valid data in the three channels for transmitting color data, serious bandwidth waste is caused in a data transmission process between the other device and the field sequential display device, hence even frame dropping or lagging will occur during a display process of a video.

SUMMARY

In view of this, embodiments of the present disclosure provide an image processing method and apparatus to solve problems in related arts.

According to a first aspect of embodiments of the present disclosure, an image processing method is provided, where the method includes:
determining color values of original pixels in an original color image, wherein each of the original pixels includes N original sub-pixels corresponding to basic colors of a color model respectively, each color value includes color components of the basic colors, and N is a positive integer greater than 1;
generating mixed images corresponding to the basic colors respectively according to the color values of the original pixels, wherein for each of mixed pixels in each of the mixed images corresponding to one of the basic colors, N original pixels corresponding one-by-one to N mixed sub-pixels in the mixed pixel are determined according to a pixel-position mapping relation, and the color components in the color values of the N original pixels are determined as color components corresponding to the N mixed sub-pixels respectively;
upon generating each mixed image of the mixed images, sending the each mixed image to a field sequential display device according to an image transmission rule consistent with the color model, so that the field sequential display device generates and displays a monochrome image corresponding to the basic color according to the each mixed image.

According to a second aspect of embodiments of the present disclosure, an image processing method is provided, where the method includes:
upon receiving a mixed image, determining color values of mixed pixels in the mixed image, wherein the mixed image corresponds to a basic color of a color model, and a color value of each of the mixed pixels includes color components corresponding to the basic color of N mixed sub-pixels in the mixed pixel, and N is a positive integer greater than 1;
generating a monochrome image corresponding to the basic color according to the color values of the mixed pixels, where for N mixed sub-pixels in each of the mixed pixels, N monochrome pixels in the monochrome image corresponding one-by-one to the N mixed sub-pixels are determined according to a pixel-position mapping relation, and color components of the basic color of the N mixed sub-pixels are respectively determined as color values of the N corresponding monochrome pixels;
displaying the monochrome image by controlling a display component of the field sequential display device.

According to a third aspect of embodiments of the present disclosure, an image processing apparatus is provided, where the apparatus includes one or more processors, and the one or more processors are configured to perform operations including:
determining color values of original pixels in an original color image, wherein each of the original pixels includes N original sub-pixels corresponding to basic colors of a color model respectively, each color value includes color components of the basic colors, and N is a positive integer greater than 1;
generating mixed images corresponding to the basic colors respectively according to the color values of the original pixels, wherein for each of mixed pixels in each of the mixed images corresponding to one of the basic colors, N original pixels corresponding one-by-one to N mixed sub-pixels in the mixed pixel are determined according to a pixel-position mapping relation, and the color components in the color values of the N original pixels are determined as color components corresponding to the N mixed sub-pixels respectively;

upon generating each mixed image of the mixed images, sending the each mixed image to a field sequential display device according to an image transmission rule consistent with the color model, so that the field sequential display device generates and displays a monochrome image corresponding to the basic color according to the each mixed image.

According to a fourth aspect of embodiments of the present disclosure, an image processing apparatus is provided, where the apparatus includes one or more processors, and the one or more processors are configured to perform operations including:

upon receiving a mixed image, determining color values of mixed pixels in the mixed image, wherein the mixed image corresponds to a basic color of a color model, and a color value of each of the mixed pixels includes color components corresponding to the basic color of N mixed sub-pixels in the mixed pixel, and N is a positive integer greater than 1;

generating a monochrome image corresponding to the basic color according to the color values of the mixed pixels, where for N mixed sub-pixels in each of the mixed pixels, N monochrome pixels in the monochrome image corresponding one-by-one to the N mixed sub-pixels are determined according to a pixel-position mapping relation, and color components of the basic color of the N mixed sub-pixels are respectively determined as color values of the N corresponding monochrome pixels; and displaying the monochrome image by controlling a display component of the field sequential display device.

According to a fifth aspect of embodiments of the present disclosure, an electronic device is provided, where the electronic device includes:

a processor;

a memory for storing a processor-executable instruction;

where the processor is configured to implement the image processing method according to the above first aspect or second aspect.

According to a sixth aspect of embodiments of the present disclosure, a non-transitory computer-readable storage medium storing a computer program is provided, where the program is executed by a processor to implement steps in the image processing method according to the above first aspect or the second aspect.

According to embodiments of the present disclosure, the image coding device first determines color values of original pixels in an original color image, where for each of the original pixels, the original pixel includes N original sub-pixels corresponding to different basic colors of a color model respectively, a color value of the original pixel includes color components of the basic colors corresponding to the N original sub-pixels, and N is a positive integer greater than 1; the image coding device then generates mixed images corresponding to the N basic colors respectively according to the color values of the original pixels, where for each mixed pixel in a mixed image corresponding to a basic color, N original pixels in the original color image corresponding one-by-one to N mixed sub-pixels in the mixed pixel are determined according to a pixel-position mapping relation, and color components of the basic color in the color values of the N original pixels are determined as color components corresponding to the N mixed sub-pixels respectively; finally, upon generating the mixed image corresponding to the basic color, the image coding device sends the mixed image to a field sequential display device according to an image transmission rule consistent with the color model, so that the field sequential display device generates and displays a monochrome image corresponding to the basic color according to the mixed image.

As described above, in a process of generating a mixed image corresponding to a basic color, for a mixed pixel in the mixed image corresponding to the basic color, N original pixels are determined in the original color image corresponding one-by-one to N mixed sub-pixels in the mixed pixel according to a pixel-position mapping relation, and color components of the basic color in the color values of the N original pixels are determined as color components corresponding to the mixed sub-pixels respectively. In such way, the N mixed sub-pixels in the mixed pixel of the mixed image are used to record color components of the basic color corresponding to different original pixels, that is, several color components corresponding to the basic color in the original color image are together recorded in one mixed pixel in the mixed image.

Based on this, in a subsequent process of transmitting a mixed image to the field sequential display device according to the image transmission rule consistent with the color model, compared with a process of transmitting a corresponding monochrome image according to the rule, $(N-1)/N$ of a bandwidth can be saved, thereby reducing bandwidth pressure between the image coding device and the field sequential device, and improving utilization of a data transmission channel. Correspondingly, upon receiving a mixed image, the field sequential device needs to decode the mixed image to obtain a monochrome image for displaying. Even in a case of transmission video images, frame dropping and lagging can be effectively avoided.

It shall be understood that the above general description and following detail description are only exemplary and illustrative, which does not limit the present disclosure.

BRIEF DESCRIPTION OF DRAWINGS

In order to describe technical solutions in embodiments of the present disclosure more clearly, drawings needed in the description of the embodiments will be briefly introduced below. Obviously, the drawings in the following description are only some embodiments of the present disclosure. For those of ordinary skills in the art, other drawings can be obtained according to these drawings without making creative efforts.

FIG. 1 shows a schematic diagram of a connection relation between devices according to an embodiment of the present disclosure.

FIG. 2 shows a flowchart of an image processing method according to an embodiment of the present disclosure.

FIG. 3 shows a schematic diagram of an image processing procedure according to an embodiment of the present disclosure.

FIG. 4 shows a schematic diagram illustrating position relations between original sub-pixels and mixed pixels according to an embodiment of the present disclosure.

FIG. 5 shows a schematic diagram of an original color image and coded mixed images according to an embodiment of the present disclosure.

FIG. 6 shows a flowchart of another image processing method according to an embodiment of the present disclosure.

DETAILED DESCRIPTION

Figure 7:
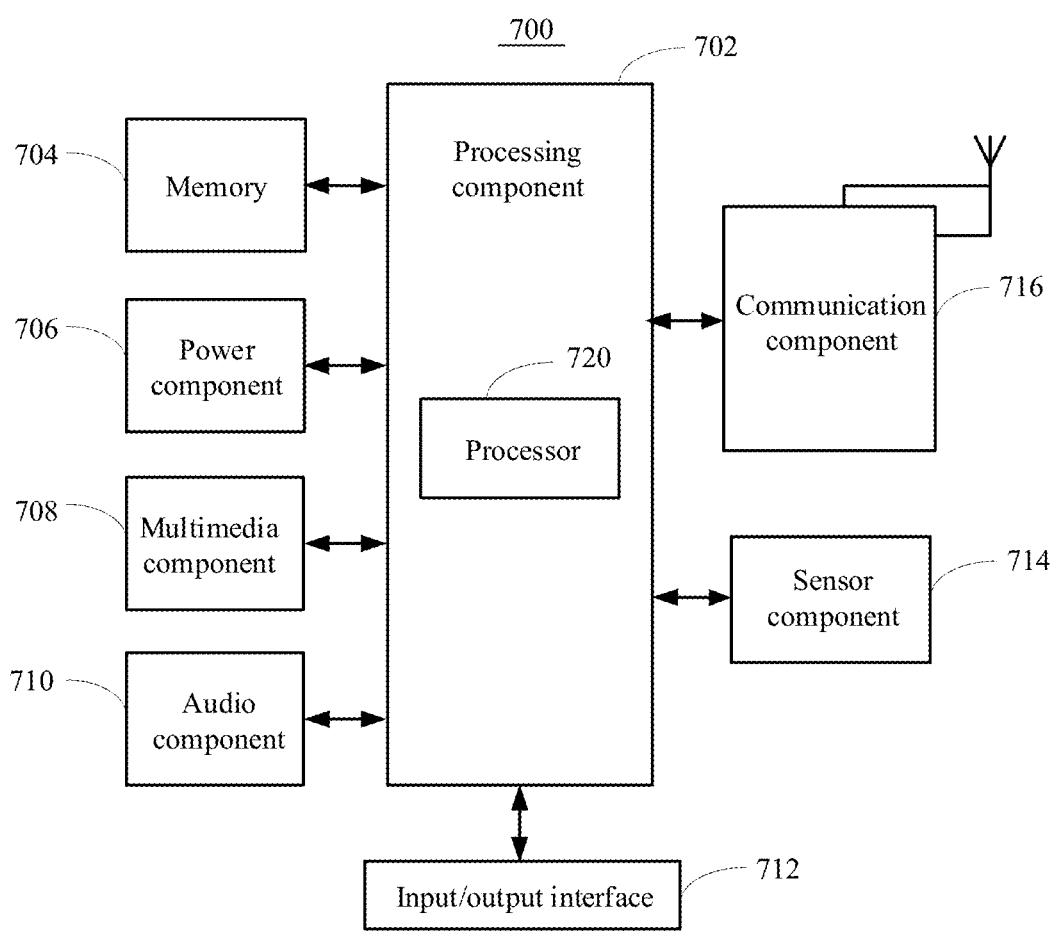
FIG. 7 shows a schematic block diagram of an image processing apparatus according to an embodiment of the present disclosure.

In the following, technical solutions in embodiments of the present disclosure will be clearly and completely described with reference to the accompanying drawings. Obviously, the described embodiments are only a part of the embodiments of the present disclosure, but not all the embodiments. Based on the embodiments in the present disclosure, all other embodiments obtained by those of ordinary skills in the art without making creative efforts belong to the scope of protection of the present disclosure.

An image processing method described in the embodiments of this specification relates to an image coding device and a field sequential display device. FIG. 1 shows a schematic diagram of a connection relation between devices provided by an exemplary embodiment. As shown in FIG. 1, an image coding device 101 is connected to a field sequential display device 103 through a data transmission channel 102.

The image coding device 101 and the field sequential display device 103 may be separate devices, for example, the image coding device 101 may be a terminal device used by users. For example, the terminal device may be a mobile phone, a tablet device, a notebook computer, a PDA (Personal Digital Assistant), a wearable device (such as smart glasses, a smart watch, etc.), a VR (Virtual Reality) device, and an AR (Augmented Reality) device. The field sequential display device 103 may be an independent display device, such as a display. In such case, the data transmission channel 102 there between can be realized through a cable. Alternatively, the image coding device 101 and the field sequential display device 103 can also be different functional components in a same device. For example, the image coding device 101 can be a processing component of a certain display device, and the field sequential display device 103 can be a display component of the certain display device (such as a display screen). At this time, the data transmission channel 102 between them can be realized through a bus of the display device or an image data transmission component corresponding to the field sequential display device 103. For example, the image coding device 101 may be a CPU (central processing unit) or a GPU (graphics processing unit) of the above device, and the field sequential display device 103 may be a display assembled in the device, where the display has its own independent controller.

In addition, the data transmission channel 102 may have various forms, for example, an interface thereof may adopt interface standards such as DP (DisplayPort), HDMI (High Definition Multimedia Interface), DVI (Digital Visual Interface), VGA (Video Graphics Array), etc., which is not limited by the embodiment of the present disclosure. In addition, a buffer may also be provided between the image coding device 101 and the field sequential display device 103, so as to facilitate the field sequential display device 103 to maintain a relatively stable refresh rate during image displaying.

In the embodiment of this specification, the image coding device 101 can code an original color image by the image processing method to obtain N mixed images, and then send each of the mixed images to the field sequential display device 103 through the data transmission channel 102. Correspondingly, the field sequential display device 103 can decode any one of the obtained mixed images by another processing method to obtain a corresponding monochrome image, and then display the monochrome image on the field sequential display device 103. It shall be understood that, for an original color image, after the image coding device 101 sends the coded N mixed images to the field sequential display device 103 sequentially, the field sequential display device 103 can sequentially decode the N mixed images and display corresponding monochrome images, so that with help of visual persistence effect of a human eye, color display effect of the original color image is presented to a viewer. In the following, coding and decoding solutions corresponding to the image processing method will be described in detail with reference to the accompanying drawings and the embodiments of the present disclosure.

FIG. 2 shows a flowchart of an image processing method according to an exemplary embodiment of the present disclosure. As shown in FIG. 2, the method is performed by an image coding device. Specifically, the method can be implemented by a CPU (Central Processing Unit) or a GPU (Graphics Processing Unit). The image processing method may include following steps 202-206:

Step 202, determining color values of original pixels in an original color image, where for each of the original pixels, the original pixel includes N original sub-pixels corresponding to different basic colors of a color model respectively, a color value of the original pixel includes color components of the basic colors corresponding to the N original sub-pixels, and N is a positive integer greater than 1.

The original color image described in the embodiment of the present disclosure may be an independent image. In such case, a field sequential display device of the present solution can repeatedly display multiple monochrome images corresponding to the image to present color display effect of the image. Alternatively, the original color image may also be a video frame image of to a video. In such case, the field sequential display device by using the present solution can sequentially display monochrome images corresponding to video frame images of the video respectively, so as to present color display effect of video pictures corresponding to the video.

In addition, the color values of the original pixels in the original color image may be presented by using values in a color space. The color model corresponding to the color space may be in any form, which is not limited by the embodiment of the present disclosure. Illustratively, the color model may be an RGB model, an RGBW model, a CMYK model, etc. The RGB model includes three basic colors of red, green and blue; the RGBW model includes four basic colors of red, green, blue and white; the CMYK model includes cyan, magenta, yellow and black.

No matter which color model is adopted, an original pixel in the original color image includes N original sub-pixels (N is a positive integer greater than 1), and respective original sub-pixels correspond to different basic colors of the color model respectively. A color value of an original pixel may include color components of the basic colors corresponding to the N original sub-pixels. For example, when the color model of the original color image is the RGB model, N=3. That is, an original pixel in the image includes original sub-pixels corresponding to three basic colors of R, G and B respectively, and the color value of the original pixel includes color components corresponding to the three original sub-pixels respectively, that is, an R value, a G value and a B value. As a matter of fact, when the original color image is displayed by adopting a conventional LCD, the original pixels in the image may correspond to different pixels in a screen respectively, and respective original sub-pixels in any one original pixel may correspond to different partitions of the corresponding pixel that can be independently controlled for displaying.

In the following, the RGB model will be taken as an example for description, with reference to FIG. 3. As shown in FIG. 3, an original color image 301 includes a plurality of original pixels of 1, 2, 3, . . . , etc. Each of the original pixels includes three original sub-pixels. For example, an original pixel 1 includes three original sub-pixels of R1, G1 and B1, and an original pixel 2 includes three original sub-pixels of R2, G2 and B2, and so on. In FIG. 3, the original sub-pixels with different basic colors are filled up with gray backgrounds of different shades for distinguishing.

An original sub-pixel in an original pixel includes a color component corresponding to a basic color. Taking the original pixel 1 as an example, the three original sub-pixels of R1, G1 and B1 have color components corresponding to red, green and blue respectively. A color component of an original sub-pixel does not exceed a value range in a color space corresponding to the RGB model. For example, in a case that color components of the basic colors in the RGB model are presented with 8-bit values, the value range of the color component of the original sub-pixel may be [0, 255]. For example, a color component of R1 corresponding to red may be 0, a color component of G1 corresponding to green may be 26, and a color component of B1 corresponding to blue may be 245, etc.

In addition, the color components of the original sub-pixels corresponding to the basic colors in the original pixel together constitute the color value of the original pixel. For example, a color value of the original pixel 1 includes color components of the original sub-pixels R1, G1 and B1 corresponding to red, green and blue respectively. That is, the three color components together constitute the color value of the original pixel 1. As can be seen, a color value of an original pixel is actually an array including N values. As can be seen, a process of determining color values of the original pixels in the original color image by the image coding device is actually a process of reading color components of the original sub-pixels included in the original pixels in the image.

It also needs to be noted that, an arrangement manner of the original sub-pixels of the original pixels as shown in FIG. 3 is only illustrative, and in application stage of the solution, the original sub-pixels in an original pixel can be arranged in any manner, which is not limited by the embodiment of the present disclosure. It can also be understood that, for any one image in FIG. 3 except for mixed images 3031-3033, a numeral noted in any one pixel (or sub-pixel) is a serial number of the pixel (or the sub-pixel) in a corresponding image, which is only used to distinguish different pixels (or sub-pixels). An image records a color value of each pixel (including color components of the sub-pixels), and a specific value of the color value (color components) does not have a necessary relation to a serial number thereof. For example, a serial number of an original pixel or an original sub-pixel in the original color image 301 is used to represent the pixel itself or the sub-pixel itself. Data denoted in a mixed pixel of mixed images 3031-3033 is used to represent the color component of which original sub-pixel corresponding to the basic color in the original color image 301 is same as the color component of the mixed pixel. For example, for a mixed sub-pixel with a serial number 7 in the red mixed image 3031, the serial number 7 represents that the color component of the mixed sub-pixel is the color component (corresponding to red) of a red original sub-pixel (with a serial number of 7) in a first original pixel of a second row of the original color image 301, and so on.

Step 204, generating mixed images corresponding to the N basic colors respectively according to the color values of the original pixels, for each mixed pixel in a mixed image corresponding to a basic color, N original pixels in the original color image corresponding one-by-one to N mixed sub-pixels in the mixed pixel are determined according to a pixel-position mapping relation, and color components of the basic color in the color values of the N original pixels are determined as color components corresponding to the N mixed sub-pixels respectively.

In a case that the color values of the original pixels in the original color image are determined, the image coding device can generate mixed images corresponding to the N basic colors based on the color values. A process of generating the mixed images is a process of determining the color components of the N mixed sub-pixels included in each of the mixed pixels in the mixed image. Specifically, for a mixed pixel including N mixed sub-pixels included in the mixed image corresponding to a basic color, the color components of the N original sub-pixels (belonging to different original pixels) in the original color image corresponding one-by-one to the N mixed sub-pixels are taken as the color components of the N mixed sub-pixels.

As shown in FIG. 3, all of the original sub-pixels in the original color image 301 can be divided into three types according to the basic colors, that is, red original sub-pixels 3021, green original sub-pixels 3022 and blue original sub-pixels 3023. The original sub-pixels of each type have relative position relations consistent with relative position relations of the original pixels to which the original sub-pixels belong in the original color image 301. It should be noted that, the above red original sub-pixels 3021, green original sub-pixels 3022 and blue original sub-pixels 3023 may be monochrome images generated according to the original sub-pixels corresponding to the basic colors, or may also be division results of sub-pixels in a logic aspect instead of actually generated monochrome images.

The image coding device can determine N original pixels corresponding one-by-one to the N mixed sub-pixels in the mixed pixel according to the pixel position mapping relation, and determine the N original sub-pixels corresponding to the basic color in the N original pixels as corresponding one-by-one to the mixed sub-pixels. The pixel position mapping relation can be used to record one-by-one corresponding relations between positions of the original sub-pixels in the original color image and positions of the corresponding mixed sub-pixels in the mixed image. Since an original pixel includes N original sub-pixels and the sub-pixels correspond to basic colors respectively, a position of an original pixel in the original color image can be determined as positions of the N original sub-pixels in the original color image. That is, relative to other original pixels or other pixels outside the original color image, the original sub-pixels corresponding to the basic colors in the original pixel are at a same position in the original color image. As shown in FIG. 3, an original pixel with a serial number of 1 in the original color image 301 includes three original sub-pixels (that is, a red original sub-pixel 1, a green original sub-pixel 1 and a blue original sub-pixel 1), positions of the three original sub-pixels in the original color image 301 can all be denoted with a serial number of "1", which also holds for other original sub-pixels and will not be repeated.

Based on the above pixel position mapping relation, the image coding device can generate mixed images corresponding to the three basic colors according to the above red original sub-pixel 3021, green original sub-pixel 3022 and blue original sub-pixel 3023, that is, generate a red mixed image 3031, a green mixed image 3032 and a blue mixed image 3033. Taking the red mixed image 3031 as an example, this image records color components of the mixed sub-pixels included in the mixed pixels. As can be known from the determining manner of the color components in step 204, a specific value of a color component of a mixed sub-pixel is same as a specific value of a color component of a corresponding original sub-pixel in the original color image 301. For example, a first mixed sub-pixel (i.e., the red mixed sub-pixel 1) in a first mixed pixel has a color component with a specific value same as a specific value of a color component of a first original sub-pixel (i.e., the red original sub-pixel 1) included in a first original pixel; for another example, a second mixed sub-pixel (i.e., the green mixed sub-pixel 2) in a second mixed pixel has a color component with a specific value same as a specific value of a color component of a second original sub-pixel (i.e., the green original sub-pixel 1) included in a second original pixel; and so on.

To ensure that a mixed image corresponding to any one basic color has the above effect, the image coding device can determine the N original pixels in the original color image corresponding one-by-one to the N mixed sub-pixels included in any one mixed pixel according to the position corresponding relations recorded in the above-mentioned pixel position mapping relation. Specifically, the image coding device can first determine a coding scaling factor according to a first size of the original color image and a second size of the mixed image, and determine a second position of the mixed pixel in the mixed image; Then, the image coding device can determine a first position, corresponding to the second position, in the original color image according to the coding scaling factor, and then determine one-by-one corresponding relations between the N original pixels at the first position and the N mixed sub-pixels in the mixed pixel.

As shown in FIG. 3, when the above-mentioned pixel position mapping relation records: serial numbers of the mixed pixels are all positive integers, and sequentially increase from left to right and from top to bottom; three mixed sub-pixels in a mixed pixel with a serial number being an odd number correspond to three original sub-pixels in the original color image, where a first original sub-pixel of the three original sub-pixels is an original sub-pixel of a first original pixel of the original color image with a serial number belonging to an odd number column, a second original sub-pixel of the three original sub-pixels is an original sub-pixel of a second original pixel adjacent to and located below the first original pixel of the original color image, and a third original sub-pixel of the three original sub-pixels is an original sub-pixel of a third original pixel adjacent to and located at the right of the first original pixel of the original color image; three mixed sub-pixels in a mixed pixel with a serial number being an even number correspond to three original sub-pixels in the original color image, where a first original sub-pixel of the three original sub-pixels is an original sub-pixel of a first original pixel which is adjacent to and located below an original pixel of the original color image with a serial number belonging to an even number column, a second sub-pixel of the three original sub-pixels is an original sub-pixel of a second original pixel which is adjacent to and located at the right of the original pixel of the original color image with the serial number belonging to the even number column, a third sub-pixel of the three original sub-pixels is an original sub-pixel of a third original pixel which is adjacent to and located at the right-bottom corner of the original pixel of the original color image with the serial number belonging to the even number column. Based on this, for three mixed sub-pixels included in a first (odd) pixel in a first row of the red mixed image 3031, the image coding device can determine: the three mixed sub-pixels correspond to red original sub-pixels in original pixels with serial numbers of 1, 7 and 2 in the original color image 301 respectively; for three mixed sub-pixels included in a second (even) pixel in the first row of the red mixed image 3031, the image coding device can determine: the three mixed sub-pixels correspond to red original sub-pixels in original pixels with serial numbers of 8, 3 and 9 in the original color image 301 respectively. Similarly, for three mixed sub-pixels included in a third (odd) pixel in a first row of the red mixed image 3031, the image coding device can determine: the three mixed sub-pixels correspond to red original sub-pixels in original pixels with serial numbers of 4, 10 and 5 in the original color image 301 respectively; for three mixed sub-pixels included in a fourth (even) pixel in the first row of the red mixed image 3031, the image coding device can determine: the three mixed sub-pixels correspond to red original sub-pixels in original pixels with serial numbers of 11, 6 and 12 in the original color image 301 respectively. Other mixed pixels in the red mixed image 3031 and mixed pixels in the green mixed image 3032 and the blue mixed image 3033 have a similar determining manner as that described above, which will not be repeated here.

The image coding device can determine a corresponding coding scaling factor according to the above pixel position mapping relation, the first size and the second size. Based on the pixel position mapping relation corresponding to FIG. 3, it can be determined that in a process of generating the red mixed image 3031 based on the original color image 301, the three original pixels with the serial numbers of 1, 7 and 2 are reduced to one mixed pixel (that is, a pixel consisted of mixed sub-pixels with serial numbers of 1, 7 and 2 shown in the red mixed image 3031), and the three original pixels with the serial numbers of 8, 3 and 9 are reduced to one mixed pixel (that is, a pixel consisted of mixed sub-pixels with serial numbers of 8, 3 and 9 shown in the red mixed image 3031). As can be seen, in a mixed image corresponding to any one basic color, a mixed pixel with an odd serial number is integrated by three original sub-pixels at corresponding positions in the original color image sequentially arranged according to a counter-clockwise direction, and a mixed pixel with an even serial number is integrated by three original sub-pixels at corresponding positions in the original color image sequentially arranged according to a clockwise direction.

Apparently, for any three original pixels and a corresponding mixed pixel, along a transverse direction, three original pixels in the original color image correspond to two mixed pixels in the mixed image; along a longitudinal direction, two original pixels in the original color image correspond to one mixed pixel in the mixed image. As can be seen, through the above coding manner, three columns of the original color image can be integrated into two columns in the mixed image, that is, a number of longitudinal columns is reduced to ⅔ of the original; at the same time, two rows of the original color image can be integrated into one row in the mixed image, that is, a number of longitudinal rows is reduced to ½ of the original. In an overall aspect, a data amount of a coded mixed image is reduced to ⅓ (½*⅔) of a data amount of the original color image. As shown in FIG. 3, if the original color image is a video frame image in a 4K video, and the first size is 3840*3840, in such case, the second size of the mixed image generated according to the above manner is 2560*1920. It shall be understood that the above size can be used to represent a number of pixels in the original color image and in the mixed image. Since an original pixel in the original color image includes 3 original sub-pixels, and a mixed pixel in the mixed image includes 3 mixed sub-pixels, data amount of color components of the original color image corresponding to the original sub-pixels is 3840*3840*3, and data amount of color components of the mixed image corresponding to the mixed sub-pixels is 2560*1920*3. Considering that image coding device generates three mixed images in total (i.e., the red mixed image 3031, the green mixed image 3032 and the blue mixed image 3033), the total data amount of the mixed images generated according to the original color image is same as the data amount of the original color image (3*2560*1920*3=3840*3840*3), that is, coded mixed images record all color components in the original color image, thus the solution can achieve lossless coding of the original color image.

For the N original pixels corresponding one-by-one to the N mixed sub-pixels in a mixed pixel, relative position relations thereof are not limited by the embodiment of the present disclosure. For example, the N original pixels can be continuously adjacent, and in such case, a position determining logic of the N original pixels is simple, which is convenient to improve coding speed. As can be known from the above embodiments, the original sub-pixels with serial numbers of 1, 7 and 2 are continuously adjacent, and connecting lines between center points of the three original sub-pixels form a right triangle. As a matter of fact, the original sub-pixels in the original color image 301 corresponding to the three mixed sub-pixels in a mixed pixel respectively may have other relative position relations. For any one of the red mixed image 3031, the green mixed image 3032 and the blue mixed image 3033, still taking that a first mixed pixel in a first row therein includes three mixed sub-pixels as an example (i.e., mixed sub-pixels with a serial number of 1), in a case that the original sub-pixels corresponding one-by-one to the three mixed sub-pixels are adjacent, in addition to that the three original sub-pixels have serial numbers of 1, 7 and 2, the serial numbers may also be 1, 2 and 3 (in such case, connecting lines of center points of the three original sub-pixels is a transversal straight line), or may also be 1, 7 and 13 (in such case, connecting lines of the three original sub-pixels is a longitudinal straight line), or may also be 7, 8 and 9, and so on. In a case that the original sub-pixels corresponding one-by-one to the three mixed sub-pixels are not adjacent, the serial numbers of the three original sub-pixels may be 1, 8 and 3 respectively, or 7, 2 and 9 respectively, or 1, 7 and 3 respectively, or 1, 3 and 5 respectively, and so on.

As can be seen from the above embodiments, in a process of generating the mixed images according to the color values of the original pixels in the original color image, determining original sub-pixels corresponding to the mixed sub-pixels respectively is of vital importance. Specifically, the image coding device can determine the above original sub-pixels according to a position formula. With reference to the embodiment shown in FIG. 3, taking that the first size of the original color image is 3840*3840 and the second size of the mixed image is 2560*1920 as an example, related formulas will be describe in the following.

As described above, the process of generating a mixed image corresponding to a basic color includes the process of determining color components of the mixed sub-pixels corresponding to a basic color of the mixed image sequentially. For a mixed pixel P with a coordinate of in.text (in.tex.x, in.tex.y) in the mixed image, the image coding device needs to determine three original sub-pixels in the original color image corresponding to the mixed pixel. Thus, a pixel position cur.pos (cur.pos.x, cur.pos.y) in the original color image corresponding to the mixed pixel P needs to be determined first.

In a case that the image coding device is capable of processing data of an integer type (e.g., the image coding solution is implemented by a CPU of the image coding device), in.tex.x∈ [0,2560], in.tex.y∈ [0,1920], in such case, cur.pos.x∈ [0,2560], cur.pos.y∈ [0,1920]. In a case that the image coding device is capable of processing data of a decimal type within a range of [0, 1] (e.g., the image coding device is a GPU), in.tex.x∈ [0,1], in.tex.y∈ [0,1]; in such case, cur.pos.x=int(in.tex.x*2560)∈ [0,2560), cur.pos.y=int (in.tex.y*1920)∈ [0,1920).

At this time, the image coding device can calculate the position coordinates raw[0], raw[1] and raw[2] of the three original pixels in the original color image corresponding to the mixed pixel P. As shown in FIG. 4, if cur.pos.x is odd, the mixed pixel P corresponds to three original pixels in a left area, and at this time, a coordinate computing formula of the three original pixels can be referred to from the following formula (1); if cur.pos.x is even, the mixed pixel P corresponds to three original pixels in a right area, and at this time, a coordinate computing formula of the three original pixels can be referred to from the following formula (2).

$$\begin{cases} raw\_pos.x = cur.pos.x * 3/2 \\ raw\_pos.y = cur.pos.y * 2 \\ raw[0] = int2(raw\_pos.x, raw\_pos.y) \\ raw[1] = int2(raw\_pos.x, raw\_pos.y + 1) \\ raw[2] = int2(raw\_pos.x + 1, raw\_pos.y) \end{cases} \quad (1)$$

$$\begin{cases} raw\_pos.x = cur.pos.x * 3/2 + 1 \\ raw\_pos.y = cur.pos.y * 2 \\ raw[0] = int2(raw\_pos.x, raw\_pos.y + 1) \\ raw[1] = int2(raw\_pos.x + 1, raw\_pos.y) \\ raw[2] = int2(raw\_pos.x + 1, raw\_pos.y + 1) \end{cases} \quad (2)$$

As described above, an image transmission manner corresponding to the coding solution can be applied to a GPU (that is, the image coding device is the GPU), and in such case, considering that a GPU of a current stage usually is capable of processing values in a range of [0, 1], the GPU can also perform normalization process to values of the first size and the second size, and represent the first position and the second position through the normalized coordinate values. Through such manner, it is ensured that specific values of the first position and the second position are within the range of [0, 1], so that the GPU can accurately and effectively coding the original color image. Normalization process is performed on the above position coordinates.

Corresponding to the above normalization process, the normalization process can also be performed on the above position coordinates. Coordinates raw_rgb[0], raw_rgb[1] and raw_rgb[2] of the three original pixels after normalization can be referred to from the following formula (3).

$$\begin{cases} raw\_rgb[0] = float2((raw[0].x)/3840.f, (raw[0].y)/3840.f) \\ raw\_rgb[1] = float2((raw[1].x)/3840.f, (raw[1].y)/3840.f) \\ raw\_rgb[2] = float2((raw[2].x)/3840.f, (raw[2].y)/3840.f) \end{cases} \quad (3)$$

To ensure accurate sampling of the color components of the original sub-pixels, an offset can be added to coordinate values of the second position, so that an offset second position is located within the original pixels. For example, 0.5 can be added to raw[0], raw[1] and raw[2] as an offset. Specifically, the formula (3) can be replaced with the formula (4).

$$\begin{cases} \text{raw\_rgb}[0] = \text{float2}((\text{raw}[0].x + 0.5)/3840.f, (\text{raw}[0].y + 0.5)/3840.f) \\ \text{raw\_rgb}[1] = \text{float2}((\text{raw}[1].x + 0.5)/3840.f, (\text{raw}[1].y + 0.5)/3840.f) \\ \text{raw\_rgb}[2] = \text{float2}((\text{raw}[2].x + 0.5)/3840.f, (\text{raw}[2].y + 0.5)/3840.f) \end{cases} \quad (4)$$

Thus, raw_rgb[0], raw_rgb[1] and raw_rgb[2] computed according to the formula (3) and formula (4) are the position coordinates of the original pixels in the original color image corresponding to the mixed pixel P. At this time, sampling (sampler) on the color components of the nine original sub-pixels corresponding to the three position coordinates can be performed by the GPU. Specifically, the GPU can read the color components of red, green and blue corresponding to the position coordinates according to the position coordinates of raw_rgb[0], raw_rgb[1] and raw_rgb[2]. Certainly, the collected and recorded color components can be normalized in advance, that is, a value range of a color component may be [0, 1].

After the color components texColor0, texColor1 and texColor2 of the three original pixels are sampled, a mixed pixel of a corresponding color is integrated according to R, G or B with reference to formula (5).

$$\begin{cases} outColorR = \text{float4}(texColor0.r, textColor1.r, texColor2.r) \\ outColorG = \text{float4}(texColor0.g, textColor1.g, texColor2.g) \\ outColorB = \text{float4}(texColor0.b, textColor1.b, texColor2.b) \end{cases} \quad (5)$$

Thus, sampled outColorR is color components of the mixed sub-pixels in a mixed pixel P in the red mixed image, sampled outColorG is color components of the mixed sub-pixels in a mixed pixel P in the green mixed image, and sampled outColorB is color components of the mixed sub-pixels in a mixed pixel P in the blue mixed image. In addition, in addition to the corresponding three color components, any outColor in formula (5) may further include related data of the mixed sub-pixels such as a transparency value, which is not limited by the embodiment of the present disclosure.

Taking a first and second mixed pixels in a first row of the mixed pixels shown in FIG. 3 as an example, as shown in FIG. 4, the serial number 1 (not shown in FIG. 3) of the first mixed pixel is odd, position coordinates of the original pixels with serial numbers 1, 7 and 2 in a left area can be computed, and by sampling the color components of the original sub-pixels, the GPU can determine color components of the mixed sub-pixels in the first mixed pixels of the first rows of the red mixed image 3031, the green mixed image 3032 and the blue mixed image 3033 respectively. Similarly, the serial number 2 of the second mixed pixel is even, and the original pixels with serial numbers 8, 3 and 9 in a right area can be computed, and by sampling the color components of the original sub-pixels, the GPU can determine color components of the mixed sub-pixels in the second mixed pixels of the first rows of the red mixed image 3031, the green mixed image 3032 and the blue mixed image 3033 respectively. Through the above manner, the GPU can determine the color components of the mixed sub-pixels in the three mixed images sequentially, so as to generate the three mixed images.

Thus, a generating process of the N mixed images corresponding to the original color image has been described. It shall be understood that, for any one original color image, the image coding device can generate the N mixed images corresponding to the image at the same time (generate the mixed images according to the formula (5) at the same time), or can generate the N mixed images sequentially according to a preset order. In a case shown in FIG. 3, the red mixed image 3031, the green mixed image 3032 and the blue mixed image 3033 are generated in sequence according to an order of R, G and B, which is not limited by the embodiment of the present disclosure.

FIG. 5 shows a schematic diagram of an original color image and coded mixed images according to an embodiment of the present disclosure. As shown in FIG. 5, part a in FIG. 5 is the original color image before coding, and parts b, c and d are the red mixed image, the green mixed image and the blue mixed image that are coded respectively. It shall be understood that, for any one mixed pixel in a mixed image, the color components of the mixed sub-pixels in the mixed pixel are actually the color components of the corresponding original sub-pixels in the original color image.

Step 206, upon generating the mixed image corresponding to the basic color, sending the mixed image to a field sequential display device according to an image transmission rule consistent with the color model, so that the field sequential display device generates and displays a monochrome image corresponding to the basic color according to the mixed image.

After the N mixed images corresponding to the original color image are generated, the image coding device can send the mixed images to a field sequential display device according to an image transmission rule consistent with the color model. For example, when the original color image is consistent with the RGB color model, the image coding device can adopt three channels corresponding to the model to transmit the mixed images. In addition, a transmission order of the mixed images may be same as or different from a generation order thereof, which is not limited by the embodiment of the present disclosure.

In an embodiment, in a case that the original color image is a video frame image of a video, the image coding device can code the video frame images sequentially according to an order of the video frames in a video time line, so as to obtain the N mixed images corresponding to each video frame image respectively, and transmit the mixed images in sequence according to an R-G-B order. For example, three mixed images corresponding to a first video frame image can be transmitted first according to the R-G-B order, and then three mixed images corresponding to a second video frame image according to the R-G-B order, and so on.

Correspondingly, upon receiving any one mixed image corresponding to a basic color, the field sequential display device can decode the image to generate a monochrome image corresponding to the basic color and display the monochrome image locally. For different images processed by the field sequential display device, operations of receiving mixed images, decoding mixed images and display monochrome images can be performed in parallel; any one mixed image can be processed in an order of receiving, decoding and displaying described above, which will not be repeated here.

According to embodiments of the present disclosure, the image coding device first determines color values of original pixels in an original color image, where for each of the original pixels, the original pixel includes N original sub-pixels corresponding to different basic colors of a color model respectively, a color value of the original pixel includes color components of the basic colors corresponding to the N original sub-pixels, and N is a positive integer greater than 1; the image coding device then generates mixed images corresponding to the N basic colors respectively according to the color values of the original pixels, where for each mixed pixel in a mixed image corresponding to a basic color, N original pixels in the original color image corresponding one-by-one to N mixed sub-pixels in the mixed pixel are determined according to a pixel-position mapping relation, and color components of the basic color in the color values of the N original pixels are determined as color components corresponding to the N mixed sub-pixels respectively; finally, upon generating the mixed image corresponding to the basic color, the image coding device sends the mixed image to a field sequential display device according to an image transmission rule consistent with the color model, so that the field sequential display device generates and displays a monochrome image corresponding to the basic color according to the mixed image.

As described above, in a process of generating a mixed image corresponding to a basic color, for a mixed pixel in the mixed image corresponding to the basic color, N original pixels are determined in the original color image corresponding one-by-one to N mixed sub-pixels in the mixed pixel according to a pixel-position mapping relation, and color components of the basic color in the color values of the N original pixels are determined as color components corresponding to the mixed sub-pixels respectively. In such way, the N mixed sub-pixels in the mixed pixel of the mixed image are used to record color components of the basic color corresponding to different original pixels, that is, several color components corresponding to the basic color in the original color image are together recorded in one mixed pixel in the mixed image.

Based on this, in a subsequent process of transmitting a mixed image to the field sequential display device according to the image transmission rule consistent with the color model, compared with a process of transmitting a corresponding monochrome image according to the rule, $(N-1)/N$ of a bandwidth can be saved, thereby reducing bandwidth pressure between the image coding device and the field sequential device, and improving utilization of a data transmission channel. Correspondingly, upon receiving a mixed image, the field sequential device needs to decode the mixed image to obtain a monochrome image for displaying. Even in a case of transmission video images, frame dropping and lagging can be effectively avoided.

For the original color image shown in FIG. 3, if a monochrome image transmission manner in related arts is adopted, the image coding device needs to adopt three channels to transmit the three monochrome images corresponding to the original color image 301 respectively, and at this time, an actual transmitted data amount is 3840*3840*3*3, while a data amount of 3840*3840*3*2 is invalid data (corresponding to two transmitting channels respectively), and a channel utilization rate is 33.3%. In contrast, after the three mixed images corresponding to the original color image 301 are generated by using the above described coding solution, the image coding device can use the three channels to transmit the three mixed images respectively. At this time, an actually transmitted data amount is 2560*1920*3*3, where all data therein is color components of the original sub-pixels in the original color image, that is, valid data, and the utilization rate of the channel is 100%. As can be seen, the present solution can achieve lossless coding of the original color image; compared with the solution in related arts, the present solution can greatly improve utilization rate of the channels in the image transmission process, and effectively avoid frame dropping or lagging in the process of transmitting video images.

Corresponding to the image processing method mentioned above used to code the original color image to generate mixed images, embodiments of the present disclosure further provide another image processing method, used to decode received mixed images for displaying, which will be described in detail with reference to FIG. 6 and related embodiments.

FIG. 6 shows a flowchart of another image processing method according to an exemplary embodiment of the present disclosure. As shown in FIG. 3, the method is performed by a field sequential display device. The image processing method may include following steps 602-606:

Step 602, upon receiving a mixed image sent according to an image transmission rule consistent with a color model, determining color values of mixed pixels in the mixed image, where the mixed image corresponds to a basic color of the color model, and a color value of each mixed pixel includes color components corresponding to the basic color of N mixed sub-pixels in the mixed pixel, and N is a positive integer greater than 1.

Similar to the above embodiments, a process of determining color values of a mixed pixel in the mixed image is a process of determining color components of the mixed sub-pixels corresponding to a basic color in the mixed pixel. Based on the above embodiments, the image coding device can send the red mixed image 3031, the green mixed image 3032 and the blue mixed image 3033 to the field sequential display device in sequence according to an order of R, G and B. Correspondingly, the field sequential display device can sequentially decode the mixed images received respectively, so as to obtain monochrome images.

Step 604, generating a monochrome image corresponding to the basic color according to the color values of the mixed pixels, where for the N mixed sub-pixels in the mixed pixel, N monochrome pixels in the monochrome image corresponding one-by-one to the N mixed sub-pixels are determined according to a pixel-position mapping relation, and color components of the basic color of the N mixed sub-pixels are respectively determined as a color value of a corresponding monochrome pixel.

Corresponding to the above coding process, in the process of generating a monochrome image corresponding to a basic color according to the mixed pixels, monochrome pixels in the monochrome image corresponding to the mixed sub-pixels in the mixed image need to be determined. For example, for the N mixed sub-pixels included in a mixed pixel, N monochrome pixels in the monochrome image corresponding one-by-one to the N mixed sub-pixels can be determined according to the pixel position mapping relation.

In an embodiment, the field display device can determine a decoding scaling factor according to a third size of the monochrome image and a second size of the mixed image, and determine a second position of a mixed pixel in the mixed image; and then determine a third position corresponding to the second position in the monochrome image according to the decoding scaling factor, and determine one-by-one corresponding relations between the N monochrome pixels at the third position and the N mixed sub-pixels in the mixed pixel.

Taking the red mixed image 3031 shown in FIG. 3 as an example, for a first and second mixed pixels in a first row of the mixed image, as shown in FIG. 4, the first mixed pixel has an odd serial number of 1 (serial numbers of the mixed pixels are not shown in FIG. 3), and position coordinates of the original pixels with serial numbers of 1, 7 and 2 in a left area can be computed according to formula (1), thus the field sequential display device can determine the color components of the mixed sub-pixels recorded in the first mixed pixel as the color values of monochrome pixels with serial numbers of 1, 7 and 2 in a red image 3041. Similarly, the second mixed pixel has an even serial number of 2, and position coordinates of the original pixels with serial numbers of 8, 3 and 9 in a right area can be computed according to formula (2), thus the field sequential display device can determine the color components of the mixed sub-pixels recorded in the second mixed pixel as the color values of monochrome pixels with serial numbers of 8, 3 and 9 in the red image 3041.

Through the above manner, the GPU can determine color values of monochrome pixels in the red image 3041 sequentially, so as to obtain the red image 3041. Since the mixed sub-pixels in the red mixed pixel record color components of the original sub-pixels corresponding to red in the original color image, color values of the monochrome pixels in the red image 3041 generated through the above manner all correspond to red, thus the red image is the monochrome image of the red mixed image 3031.

Similarly, a green image 3042 corresponding to the green mixed image and a blue image 3043 corresponding to the blue mixed image 3033 can be generated respectively through the above manner.

Step 606, displaying the monochrome image by controlling a display component of the field sequential display device.

The field sequential display device may include a control component and a display component, and any one component can be implemented through software and hardware resources in the field sequential display device. After a monochrome image is generated, the field sequential display device can control the display component to display the monochrome image. Specifically, liquid crystals and color films of pixels in the display component can be controlled, so as to control the pixels to display corresponding colors and display the monochrome image from an overall aspect. It shall be understood that, the field sequential display device can sequentially display monochrome images corresponding to different basic colors according to a preset order and a preset refresh rate, so as to present color display effect of the original color image with help of "visual persistence effect" of human eyes. Specifically, records of operating principles of the field sequential display device can be referred to from related arts, which will not be described herein.

As described above, in a process of generating a mixed image corresponding to a basic color, for a mixed pixel in the mixed image corresponding to the basic color, N original pixels are determined in the original color image corresponding one-by-one to N mixed sub-pixels in the mixed pixel according to a pixel-position mapping relation, and color components of the basic color in the color values of the N original pixels are determined as color components corresponding to the mixed sub-pixels respectively. In such way, the N mixed sub-pixels in the mixed pixel of the mixed image are used to record color components of the basic color corresponding to different original pixels, that is, several color components corresponding to the basic color in the original color image are together recorded in one mixed pixel in the mixed image.

Based on this, in a subsequent process of transmitting a mixed image to the field sequential display device according to the image transmission rule consistent with the color model, compared with a process of transmitting a corresponding monochrome image according to the rule, $(N-1)/N$ of a bandwidth can be saved, thereby reducing bandwidth pressure between the image coding device and the field sequential device, and improving utilization of a data transmission channel. Correspondingly, upon receiving a mixed image, the field sequential device needs to decode the mixed image to obtain a monochrome image for displaying. Even in a case of transmission video images, frame dropping and lagging can be effectively avoided.

Corresponding to the embodiments of the image processing method, the present disclosure further provides embodiments of an image processing apparatus. The apparatus is applied to an image coding device, where the apparatus includes one or more processors, and the one or more processors are configured to perform operations including:

determining color values of original pixels in an original color image, where for each of the original pixels, the original pixel includes N original sub-pixels corresponding to different basic colors of a color model respectively, a color value of the original pixel includes color components of the basic colors corresponding to the N original sub-pixels, and N is a positive integer greater than 1;

generating mixed images corresponding to the N basic colors respectively according to the color values of the original pixels, where for each mixed pixel in a mixed image corresponding to a basic color, N original pixels in the original color image corresponding one-by-one to N mixed sub-pixels in the mixed pixel are determined according to a pixel-position mapping relation, and color components of the basic color in the color values of the N original pixels are determined as color components corresponding to the N mixed sub-pixels respectively;

upon generating the mixed image corresponding to the basic color, sending the mixed image to a field sequential display device according to an image transmission rule consistent with the color model, so that the field sequential display device generates and displays a monochrome image corresponding to the basic color according to the mixed image.

In an embodiment, the processor is further configured to perform operations including:

determining a coding scaling factor according to a first size of the original color image and a second size of the mixed image, and determining a second position of the mixed pixel in the mixed image;

determining a first position corresponding to the second position in the original color image according to the coding scaling factor, and determining one-by-one corresponding relations between the N original pixels at the first position and the N mixed sub-pixels in the mixed pixel.

In an embodiment, the image coding device is a graphics processing unit GPU, and the processor is further configured to perform operations including:

performing normalization process on values of the first size and the second size, and presenting the first position and the second position with coordinate values that are normalized.

In an embodiment, the processor is further configured to perform operations including:

adding an offset to coordinate values of the second position, so that an offset second position is located within the original pixels.

In an embodiment, the N original pixels in the original color image corresponding one-by-one to the N mixed sub-pixels are continuously adjacent.

In an embodiment, the color model is an RGB model, and N=3.

In an embodiment, the original color image is an image of a video frame of a video.

Corresponding to the embodiments of the image processing method, the present disclosure further provides embodiments of another image processing apparatus. The apparatus is applied to a field sequential display device, where the apparatus includes one or more processors, and the one or more processors are configured to perform operations including:

upon receiving a mixed image sent according to an image transmission rule consistent with a color model, determining color values of mixed pixels in the mixed image, where the mixed image corresponds to a basic color of the color model, and a color value of each mixed pixel includes color components corresponding to the basic color of N mixed sub-pixels in the mixed pixel, and N is a positive integer greater than 1;

generating a monochrome image corresponding to the basic color according to the color values of the mixed pixels, where for the N mixed sub-pixels in the mixed pixel, N monochrome pixels in the monochrome image corresponding one-by-one to the N mixed sub-pixels are determined according to a pixel-position mapping relation, and color components of the basic color of the N mixed sub-pixels are respectively determined as a color value of a corresponding monochrome pixel;

displaying the monochrome image by controlling a display component of the field sequential display device.

In an embodiment, the processor is further configured to perform operations including:

determining a decoding scaling factor according to a third size of the monochrome image and a second size of the mixed image, and determining a second position of the mixed pixel in the mixed image;

determining a third position corresponding to the second position in the monochrome image according to the decoding scaling factor, and determining one-by-one corresponding relations between the N monochrome pixels at the third position and the N mixed sub-pixels in the mixed pixel.

Embodiments of the present disclosure further provides an electronic device, including: a processor; a memory configured to store a processor-executable instruction; where the processor is configured to implement the image processing method according to any one of the above embodiments.

Embodiments of the present disclosure further provides a non-transitory computer-readable storage medium storing a computer program, where the program is executed by a processor to implement steps in the image processing method according to any one of the above embodiments.

With regard to the apparatus in the above embodiments, specific ways for each module to perform operations have been described in detail in the embodiments of related methods, and will not be described in detail here.

FIG. 7 shows a schematic block diagram of an image processing apparatus 700 according to an embodiment of the present disclosure. For example, the apparatus 700 may be a mobile phone, a computer, a digital broadcasting terminal, a messaging device, a game console, a tablet device, a medical device, a fitness device, a personal digital assistant and the like.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 generally controls overall operations of the apparatus 700, such as operations associated with display, telephone call, data communication, camera operation and recording operation. The processing component 702 may include one or more processors 720 to execute instructions to complete all or part of the steps of the image processing method described above. In addition, the processing component 702 may include one or more modules to facilitate the interactions between the processing component 702 and other components. For example, the processing component 702 may include a multimedia module to facilitate interactions between the multimedia component 708 and the processing component 702.

The memory 704 is configured to store various types of data to support operations in the apparatus 700. Examples of these data include instructions for any application or method operating on the apparatus 700, contact data, phone book data, messages, pictures, videos, and the like. The memory 704 may be realized by any type of volatile or non-volatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 706 provides power to various components of the apparatus 700. The power component 706 may include a power management system, one or more power supplies, and other components associated with generating, managing and distributing power for the apparatus 700.

The multimedia component 708 includes a screen that provides an output interface between the apparatus 700 and the user. In some embodiments, the screen may include a liquid crystal display (LCD), a field sequential display and a touch panel (TP). If the screen includes a touch panel, the screen may be implemented as a touch screen to receive an input signal from a user. The touch panel includes one or more touch sensors to sense touch, sliding and gestures on the touch panel. The touch sensor may not only sense the boundary of a touch or sliding action, but also detect the duration and pressure related to the touch or sliding operation. In some embodiments, the multimedia component 708 includes a front camera and/or a rear camera. When the apparatus 700 is in an operation mode, such as a shooting mode or a video mode, the front camera and/or the rear camera can receive external multimedia data. Each front camera and rear camera can be a fixed optical lens system or have focal length and optical zoom capability.

The audio component 710 is configured to output and/or input audio signals. For example, the audio component 710 includes a microphone (MIC) configured to receive external audio signals when the apparatus 700 is in the operation mode, such as a call mode, a recording mode and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and peripheral interface modules, which may be keyboards, click-wheels, buttons, etc.

These buttons may include, but are not limited to, home button, volume button, start button and lock button.

The sensor component 714 includes one or more sensors for providing various aspects of state evaluations for the apparatus 700. For example, the sensor component 714 can detect on/off states of the apparatus 700, relative positioning of components, such as the display and keypad of the apparatus 700, the position change of the apparatus 700 or a component of the apparatus 700, the presence or absence of user contact with the apparatus 700, the orientation or acceleration/deceleration of the apparatus 700 and the temperature change of the apparatus 700. The sensor component 714 may include a proximity sensor configured to detect the presence of a nearby object without any physical contact. The sensor component 714 may also include an optical sensor, such as a CMOS or CCD image sensor, for use in imaging applications. In some embodiments, the sensor component 714 may further include an acceleration sensor, a gyro sensor, a magnetic sensor, a pressure sensor or a temperature sensor.

The communication component 716 is configured to facilitate wired or wireless communication between the apparatus 700 and other devices. The apparatus 700 can access a wireless network based on communication standards, such as WiFi, 2G or 3G, 4G LTE, 6G NR or their combination. In an exemplary embodiment, the communication component 716 receives a broadcast signal or broadcast related information from an external broadcast management system via a broadcast channel. In an exemplary embodiment, the communication component 716 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 700 may be implemented by one or more application specific integrated circuits (ASIC), digital signal processors (DSP), digital signal processing devices (DSPD), programmable logic devices (PLD), field programmable gate arrays (FPGA), controllers, micro-controllers, microprocessors or other electronic components for performing the above-mentioned image processing methods.

In an exemplary embodiment, there is also provided a non-transitory computer-readable storage medium including an instruction. For example, the memory 704 including the instruction, where the instruction can be executed by the processor 720 of the apparatus 700 to complete the above image processing method. For example, the non-transitory computer-readable storage medium may be ROM, random access memory (RAM), CD-ROM, magnetic tape, floppy disk, optical data storage device, etc.

Those skilled in the art will easily think of other embodiments of the present disclosure after considering the specification and practicing the embodiments disclosed herein. The present disclosure is intended to cover any variation, use or adaptation of the present disclosure, which follows the general principles of the present disclosure and includes common knowledge or common technical means in the technical field that are not disclosed in the present disclosure. The specification and embodiments are to be regarded as exemplary only, with the true scope and spirit of the disclosure being indicated by the following claims.

It should be understood that the present disclosure is not limited to the precise structure described above and shown in the drawings, and various modifications and changes can be made without departing from its scope. The scope of the present disclosure is limited only by the appended claims.

It should be noted that in the specification, relational terms such as "first" and "second" are only used to distinguish one entity or operation from another entity or operation, and do not necessarily require or imply that there is any such actual relationship or order between these entities or operations. The terms "including", "including" or any other variation thereof are intended to cover non-exclusive inclusion, so that a process, method, article or equipment including a series of elements includes not only those elements, but also other elements not explicitly listed or elements inherent to such process, method, article or equipment. Without further restrictions, an element defined by the phrase "including a" does not exclude the existence of other identical elements in the process, method, article or equipment including the element.

The method and apparatus provided by the embodiment of the disclosure are described in detail above, and the principle and implementation of the disclosure are illustrated by using specific embodiments herein. The description of the above embodiments is only used to help understand the method and its core idea of the disclosure. At the same time, according to the idea of the present disclosure, there will be some changes in the specific implementation and application scope for those of ordinary skills in the art. To sum up, the contents of this specification should not be understood as limiting the present disclosure.

The invention claimed is:

1. An image processing method comprising:
   determining color values of original pixels in an original color image, wherein each of the original pixels comprises N original sub-pixels corresponding to basic colors of a color model respectively, each color value comprises color components of the basic colors, and N is a positive integer greater than 1;
   generating mixed images corresponding to the basic colors respectively according to the color values of the original pixels, wherein for each of mixed pixels in each of the mixed images corresponding to one of the basic colors, N original pixels corresponding one-by-one to N mixed sub-pixels in the mixed pixel are determined according to a pixel-position mapping relation, and the color components in the color values of the N original pixels are determined as color components corresponding to the N mixed sub-pixels respectively; and
   upon generating each mixed image of the mixed images, sending the each mixed image to a field sequential display device according to an image transmission rule consistent with the color model, so that the field sequential display device generates and displays a monochrome image corresponding to the basic color according to the each mixed image;
   wherein the original color image comprises a first number of original pixels, each of the mixed images comprises a second number of mixed pixels, and the monochrome image comprises the first number of pixels, wherein the first number is greater than the second number.

2. The method according to claim 1, wherein the N original pixels are determined by:
   determining a coding scaling factor according to a first size of the original color image and a second size of the mixed image, and determining a second position of the mixed pixel in the mixed image; and
   determining a first position corresponding to the second position in the original color image according to the coding scaling factor, and determining one-by-one corresponding relations between the N original pixels at the first position and the N mixed sub-pixels in the mixed pixel.

3. The method according to claim 2, further comprising: normalizing coordinate values of the first size and the second size, and
presenting the first position and the second position with the coordinate values that are normalized.

4. The method according to claim 2, further comprising: adding an offset to coordinate values of the second position, so that a second position added with the offset is located within the original color image.

5. The method according to claim 1, wherein the N original pixels in the original color image corresponding one-by-one to the N mixed sub-pixels are continuously adjacent.

6. The method according to claim 1, wherein the color model is an RGB model, and N=3.

7. The method according to claim 1, wherein the original color image is an image of a video frame of a video.

8. The image processing method according to claim 1, wherein generating mixed images corresponding to the basic colors respectively according to the color values of the original pixels comprises:
generating N monochrome images corresponding to the basic colors respectively according to the color values of the original pixels; and
generating the mixed images according to the monochrome images.

9. An image processing method, comprising:
upon receiving a mixed image, determining color values of mixed pixels in the mixed image, wherein the mixed image corresponds to a basic color of a color model, and a color value of each of the mixed pixels comprises color components corresponding to the basic color of N mixed sub-pixels in the mixed pixel, and N is a positive integer greater than 1;
generating a monochrome image corresponding to the basic color according to the color values of the mixed pixels, wherein for N mixed sub-pixels in each of the mixed pixels, N monochrome pixels in the monochrome image corresponding one-by-one to the N mixed sub-pixels are determined according to a pixel-position mapping relation, and color components of the basic color of the N mixed sub-pixels are respectively determined as color values of the N corresponding monochrome pixels; and
displaying the monochrome image by controlling a display component of the field sequential display device;
wherein the mixed image is generated according to color values of original pixels in an original color image; the original color image comprises a first number of original pixels, the mixed image comprises a second number of mixed pixels, and the monochrome image comprises the first number of pixels, wherein the first number is greater than the second number.

10. The method according to claim 9, wherein the N monochrome pixels are determined by:
determining a decoding scaling factor according to a third size of the monochrome image and a second size of the mixed image, and determining a second position of the mixed pixel in the mixed image; and
determining a third position corresponding to the second position in the monochrome image according to the decoding scaling factor, and determining one-by-one corresponding relations between the N monochrome pixels at the third position and the N mixed sub-pixels in the mixed pixel.

11. An image processing apparatus, comprising one or more processors, and the one or more processors are configured to perform operations comprising:
determining color values of original pixels in an original color image, wherein each of the original pixels comprises N original sub-pixels corresponding to basic colors of a color model respectively, each color value comprises color components of the basic colors, and N is a positive integer greater than 1;
generating mixed images corresponding to the basic colors respectively according to the color values of the original pixels, wherein for each of mixed pixels in each of the mixed images corresponding to one of the basic colors, N original pixels corresponding one-by-one to N mixed sub-pixels in the mixed pixel are determined according to a pixel-position mapping relation, and the color components in the color values of the N original pixels are determined as color components corresponding to the N mixed sub-pixels respectively;
upon generating each mixed image of the mixed images, sending the each mixed image to a field sequential display device according to an image transmission rule consistent with the color model, so that the field sequential display device generates and displays a monochrome image corresponding to the basic color according to the each mixed image;
wherein the original color image comprises a first number of original pixels, each of the mixed images comprises a second number of mixed pixels, and the monochrome image comprises the first number of pixels, wherein the first number is greater than the second number.

12. An image processing apparatus, comprising one or more processors, and the one or more processors are configured to implement the method according to claim 9.

13. A non-transitory computer-readable storage medium storing a computer program, wherein the program is executed by a processor to implement the method according to claim 1.

14. A non-transitory computer-readable storage medium storing a computer program, wherein the program is executed by a processor to implement the method according to claim 9.

* * * * *